US012664084B2

(12) United States Patent
Zhang et al.

(10) Patent No.: US 12,664,084 B2
(45) Date of Patent: Jun. 23, 2026

(54) DATA PROCESSING METHOD THAT DYNAMICALLY DETERMINES STRIP SIZES FOR VARIOUS DATA, DATA PROCESSING DEVICE, ELECTRONIC APPARATUS, AND STORAGE MEDIUM CORRESPONDING TO THE DATA PROCESSING METHOD

(71) Applicant: SAMSUNG ELECTRONICS CO., LTD., Suwon-si (KR)

(72) Inventors: Ting Zhang, Suwon-si (KR); Sizhe Xiong, Suwon-si (KR); Huimei Xiong, Suwon-si (KR); Weibang Liu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/404,651

(22) Filed: Jan. 4, 2024

(65) Prior Publication Data

US 2025/0103483 A1     Mar. 27, 2025

(30) Foreign Application Priority Data

Sep. 22, 2023    (CN) .......................... 202311234778.4

(51) Int. Cl.
G06F 12/00      (2006.01)
G06F 12/02      (2006.01)
G06N 5/022      (2023.01)

(52) U.S. Cl.
CPC ......... *G06F 12/0246* (2013.01); *G06N 5/022* (2013.01)

(58) Field of Classification Search
CPC ........................... G06F 12/0246; G06N 5/022
USPC ........................................................ 711/103
See application file for complete search history.

(56) References Cited

U.S. PATENT DOCUMENTS

| | | | |
|---|---|---|---|
| 6,591,338 | B1 | 7/2003 | Horst et al. |
| 2013/0262920 | A1 | 10/2013 | Jung et al. |
| 2016/0048342 | A1 | 2/2016 | Jia et al. |
| 2021/0019047 | A1* | 1/2021 | Zhang ..................... G06F 3/061 |
| 2022/0171008 | A1* | 6/2022 | Zeller ................ G01R 33/5608 |
| 2022/0300201 | A1 | 9/2022 | Vaknin et al. |
| 2022/0414438 | A1* | 12/2022 | Zhou ...................... G06N 3/063 |

FOREIGN PATENT DOCUMENTS

| | | | | |
|---|---|---|---|---|
| CN | 102819408 | B | 1/2016 | |
| CN | 113867644 | A | 12/2021 | |
| WO | WO-2013048451 | A1 * | 4/2013 | .......... G06F 3/0607 |
| WO | WO-2016190891 | A1 * | 11/2016 | .......... G06F 3/0679 |

OTHER PUBLICATIONS

WO2013048451 2013.*
2016.*

* cited by examiner

*Primary Examiner* — Mardochee Chery
(74) *Attorney, Agent, or Firm* — Sughrue Mion, PLLC

(57) ABSTRACT

A data processing method dynamically determines a strip size for various data, and uses the dynamically determined strip size for the various data to store the various data into Redundant Arrays of Independent Disks (RAID) storage apparatuses.

18 Claims, 4 Drawing Sheets

S301 acquiring current I/O data of a plurality of storage apparatuses connected based on the RAID

S302 determining a stripe size for data reading and writing based on the current I/O data

S303 storing data into the plurality of storage apparatuses based on the stripe size

DATA PROCESSING METHOD THAT DYNAMICALLY DETERMINES STRIP SIZES FOR VARIOUS DATA, DATA PROCESSING DEVICE, ELECTRONIC APPARATUS, AND STORAGE MEDIUM CORRESPONDING TO THE DATA PROCESSING METHOD

CROSS-REFERENCE TO RELATED APPLICATION

This application is based on and claims priority to Chinese Patent Application No. 202311234778.4, filed on Sep. 22, 2023, in the State Intellectual Property Office of China, the disclosure of which being incorporated by reference herein in its entirety.

BACKGROUND

The present disclosure relates to a data processing technology, and more specifically, to a data processing method, a data processing device, an electronic apparatus, and a storage medium.

Generally, in order to optimize data processing and storage performance, the data processing of a dual storage system having two storage apparatuses may be used. The dual storage system in the related art may be constructed by, for example, physically connecting two storage apparatuses directly, or connecting two storage apparatuses based on Redundant Arrays of Independent Disks (RAID). However, the data processing of the former does not improve a data processing performance relative to a single storage apparatus, and the data processing of the latter cannot achieve an operation with an optimal data processing performance.

Therefore, there are needs for data processing methods, data processing devices, electronic apparatuses, and storage mediums that can enhance the data processing performance of a storage system having a plurality of storage apparatuses.

SUMMARY

It is an aspect to provide a data processing method, a data processing device, an electronic apparatus, and a storage medium to address at least the above problems and/or drawbacks.

According to an aspect of one or more embodiments, there is provided a data processing method comprising acquiring Input/Output (I/O) data of a plurality of storage apparatuses connected based on Redundant Arrays of Independent Disks (RAID); determining a stripe size for a data operation based on the I/O data; and storing the I/O data into the plurality of storage apparatuses based on the stripe size.

According to another aspect of one or more embodiments, there is provided a data processing device comprising at least one processor configured to function as at least a data acquirer configured to acquire Input/Output (I/O) data of a plurality of storage apparatuses connected based on Redundant Arrays of Independent Disks (RAID); a stripe determiner configured to determine a stripe size for a data operation based on the I/O data; and a data storer configured to store the I/O data into the plurality of storage apparatuses based on the stripe size.

According to yet another aspect of one or more embodiments, there is provided an electronic apparatus comprising at least one processor; and at least one memory that stores computer executable instructions, wherein the computer executable instructions, when accessed and executed by the at least one processor, cause the at least one processor to perform the data processing method.

According to yet another aspect of one or more embodiments, there is provided a non-transitory computer-readable storage medium that stores instructions which, when executed by at least one processor, cause the at least one processor to perform the data processing method.

BRIEF DESCRIPTION OF THE DRAWINGS

The above and other aspects will become more apparent by the following description in conjunction with the accompanying drawings, in which:

FIG. 3 is a flow chart illustrating a data processing method according to some embodiments.

DETAILED DESCRIPTION

Figure 1:
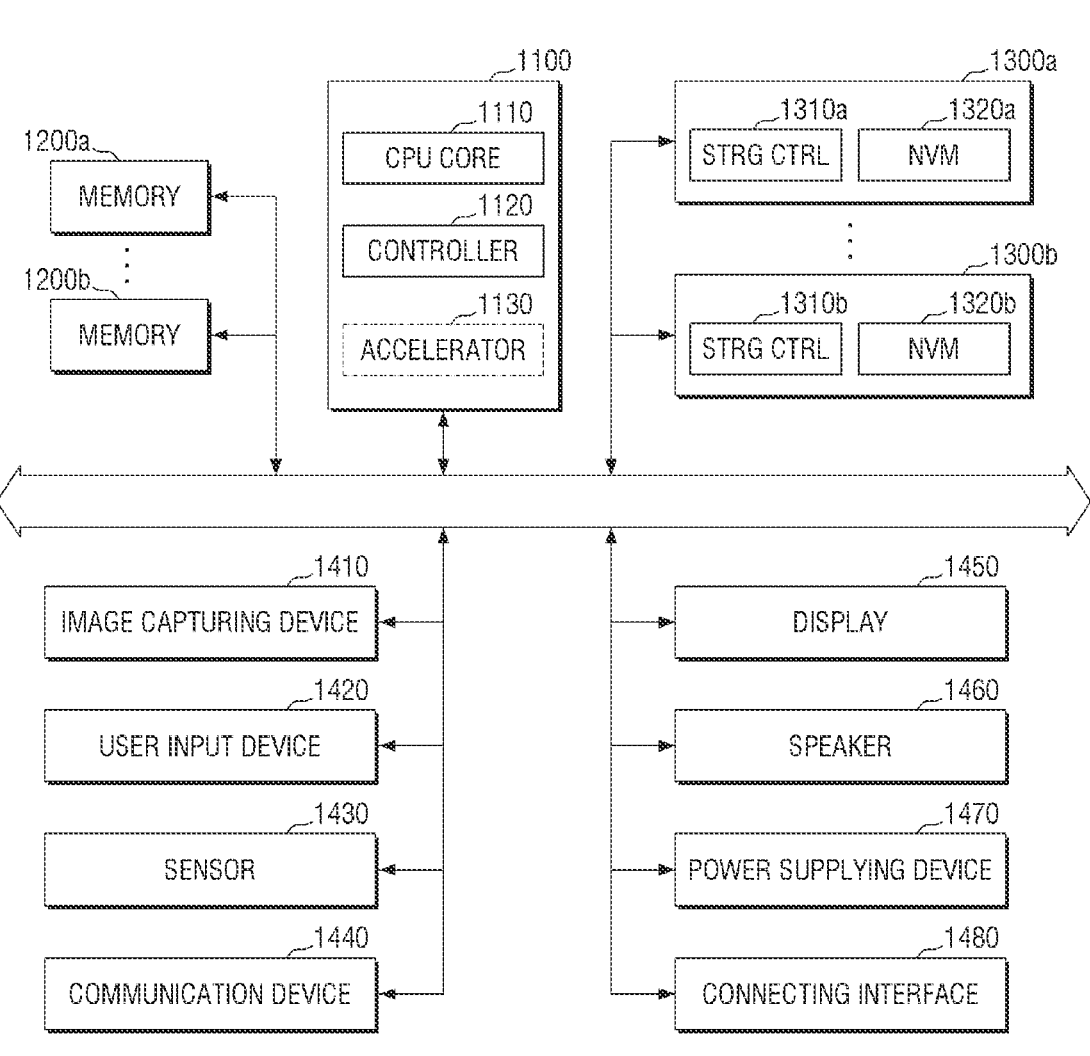
FIG. 1 shows a schematic diagram of a system to which a storage device is applied, according to some embodiments.

In order to enable those ordinary skilled in the art to better understand the technical solution of the present disclosure, technical solutions in embodiments of the present disclosure will be described clearly and completely in combination with the accompanying drawings.

The embodiments and terminologies used with respect to the embodiments are not intended to limit techniques described herein to specific embodiments, and should be understood to include various modifications, equivalents, and/or alternatives of the embodiments. As used here, each of a plurality of descriptions such as "A or B", "at least one of A or B", "at least one of A and B", "A, B or C", "at least one of A, B, and C", and "at least one of A, B, or C" may include all possible combinations of items listed together with the corresponding one of the plurality of descriptions. As used here, terms such as "first" and "second" may be used to simply distinguish the corresponding item from another item, without limiting the items in other aspects such as importance or order.

In a related art technology of data processing, when the data processing related to a plurality of storage apparatuses is mentioned, a dual storage system having two storage apparatuses is often adopted which is constructed using two connection manners of storage apparatuses: a direct connection manner and a RAID-based connection manner. Specifically, the direct connection manner refers to a direct physical connection of two identical storage apparatuses (e.g., two Universal Flash Storages (UFSs) each having a storage capacity of 512 GB), thereby accomplishing doubling of storage capacity of data. However, the dual storage system constructed by this direct connection can only increase the storage capacity, and a performance of the data processing of the whole system still depends on a performance of a single storage apparatus (e.g., a performance of a single channel of the UFS). Thus, this dual storage system cannot accomplish improvement of the data processing performance (e.g., a performance of data reading and writing). Turning to the RAID-based connection manner, RAID technology is a technology that stripes data on a magnetic disk to enable accessing in blocks of data. The dual storage system based on the RAID connection in the related are technology may be, for example, a dual storage system which is composed by connecting a UFS and a Solid State Disk (SSD) based on a RAID 0 technology, and when the data processing is performed in this dual storage system, only a stripe in a fixed size (e.g., 512 KB) is used to perform reading and writing of data distributed to two storage apparatuses. Although such data processing method may perform data processing using a dual-channel of UFS and PCIe protocols, since different storage apparatuses often have different performance, performing data processing using the stripe in the fixed size cannot fully utilize the dual-channel of the storage system composed of the two storage apparatuses, which neither ensures a stable system performance, nor an optimal data processing performance.

Given the disadvantages of the two manners discussed above, there is a need for a data processing technology that may increase a capacity of data storage and improve the data processing performance. Various embodiments consistent with the present disclosure relate to a data processing method, a data processing device, an electronic apparatus, and a storage medium that is based on RAID, taking into account at least the above-mentioned disadvantages of the related art. The data processing method, data processing device, electronic apparatus, and storage medium according to exemplary embodiments of the present disclosure will be described in detail below with reference to FIGS. 1 to 4.

According to various embodiments, a data processing method based on Redundant Arrays of Independent Disks (RAID) may be provided, which includes acquiring current Input/output (I/O) data of a plurality of storage apparatuses connected based on the RAID, determining a stripe size for data reading and writing based on the current I/O data, and storing data into the plurality of storage apparatuses based on the stripe size.

In some embodiments, the I/O data may include at least one of a file type, an I/O size, whether the I/O is a random reading and writing, and whether I/O is a buffered I/O operation.

In some embodiments, the data processing method may further include acquiring historical I/O data of the plurality of storage apparatuses, obtaining a training model by performing model training according to the historical I/O data, using a reinforcement learning algorithm. The determining the stripe size for the data reading and writing based on the current I/O data may include determining the stripe size corresponding to the current I/O data based on the training model.

In some embodiments, the reinforcement learning algorithm may include a Q-learning algorithm. The obtaining the training model by performing the model training according to the historical I/O data, using the reinforcement learning algorithm, may include obtaining a Q-table by performing the model training according to the historical I/O data, using a Q-learning algorithm. The determining the stripe size corresponding to the current I/O data based on the training model may include obtaining the stripe size corresponding to the current I/O data by querying the Q-table.

In some embodiments, the data processing method may further include recording the stripe size and a logical address corresponding to the data stored based on the stripe size.

According to various embodiments, a data processing device based on Redundant Arrays of Independent Disks (RAID) may be provided, which includes a data acquirer configured to acquire current Input/output (I/O) data of a plurality of storage apparatuses connected based on the RAID, a stripe determiner configured to determine a stripe size for data reading and writing based on the current I/O data, and a data storage unit configured to store data into the plurality of storage apparatuses based on the stripe size.

In some embodiments, the I/O data may include at least one of a file type, an I/O size, whether the I/O is a random reading and writing, and whether the I/O is a buffered I/O operation.

In some embodiments, the data processing device may further include a model trainer configured to acquire historical I/O data of the plurality of storage apparatuses, and obtain a training model by performing model training according to the historical I/O data, using a reinforcement learning algorithm. The stripe determiner may be configured to determine the stripe size for the data reading and writing based on the current I/O data by determining the stripe size corresponding to the current I/O data based on the training model.

In some embodiments, the reinforcement learning algorithm may include a Q-learning algorithm. The model trainer may be configured to obtain the training model by performing the model training according to the historical I/O data, using the reinforcement learning algorithm by obtaining a Q-table by performing the model training according to the historical I/O data, using a Q-learning algorithm. The stripe determiner may be configured to determine the stripe size corresponding to the current I/O data based on the training model by obtaining the stripe size corresponding to the current I/O data by querying the Q-table.

In some embodiments, the data processing device may further include an address recorder configured to record the stripe size and a logical address corresponding to the data stored based on the stripe size.

According to various embodiments, an electronic apparatus may be provided, which includes at least one processor, at least one memory storing computer executable instructions, wherein the computer executable instructions, when executed by the at least one processor, cause the at least one processor to perform the data processing method as described above.

According to various embodiments, a computer-readable storage medium may be provided, wherein instructions in the computer-readable storage medium, when executed by at least one processor, cause the at least one processor to perform the data processing method as described above.

The data processing method, data processing device, electronic apparatus, and storage medium according to various embodiments are capable of dynamically determining a stripe size for data reading and writing by using a reinforcement learning method, thereby adjusting an operation of data processing suitable for current I/O data in real time and improving a data processing performance. The data processing method, data processing device, electronic apparatus, and storage medium according to various embodiments are capable of ensuring a stable and optimal performance of reading and writing operations of data processing by adjusting a stripe size in real time, thereby improving user experience. The data processing method, data processing device, electronic apparatus, and storage medium according to various embodiments are capable of quickly performing data reading and writing using a recorded address by recording a changed stripe size and the corresponding storage address of data, thereby avoiding problems such as slow data retrieval due to an unfixed stripe size.

It should be understood that the general description above and the detailed description in the following are only exemplary and explanatory, and do not limit the present disclosure.

Hereinafter, a storage apparatus may also be referred to as a storage device or memory, may include any form of storage apparatus, for example, but not limited to, a Universal Flash Storage (UFS), a Solid State Device (SSD), etc.

FIG. 1 is a diagram of a system 1000 to which a storage device is applied, according to some embodiments. According to some embodiments, the system 1000 of FIG. 1 may be a mobile system, such as a portable communication terminal (e.g., a mobile phone), a smartphone, a tablet personal computer (PC), a wearable device, a healthcare device, or an Internet of things (IoT) device. However, the system 1000 of FIG. 1 is not necessarily limited to the mobile system and in some embodiments may be a PC, a laptop computer, a server, a media player, or an automotive device (e.g., a navigation device).

Referring to FIG. 1, the system 1000 may include a main processor 1100, memories (e.g., 1200a and 1200b), and storage devices (e.g., 1300a and 1300b). In some embodiments, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. In some embodiments, each of the memories 1200a and 1200b may include a volatile memory, such as static random access memory (SRAM) and/or dynamic RAM (DRAM). In some embodiments, each of the memories 1200a and 1200b may include non-volatile memory, such as a flash memory, phase-change RAM (PRAM) and/or resistive RAM (RRAM). In some embodiments, the memories 1200a and 1200b may be implemented in the same package as the main processor 1100.

The storage devices 1300a and 1300b may serve as non-volatile storage devices configured to store data regardless of whether power is supplied thereto, and may have larger storage capacity than the memories 1200a and 1200b. The storage devices 1300a and 1300b may respectively include storage controllers (STRG CTRL) 1310a and 1310b and Non-Volatile Memories (NVMs) 1320a and 1320b configured to store data via the control of the storage controllers 1310a and 1310b. In some embodiments, the NVMs 1320a and 1320b may include flash memories having a two-dimensional (2D) structure or a three-dimensional (3D) V-NAND structure. In some embodiments, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In some embodiments, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 2:
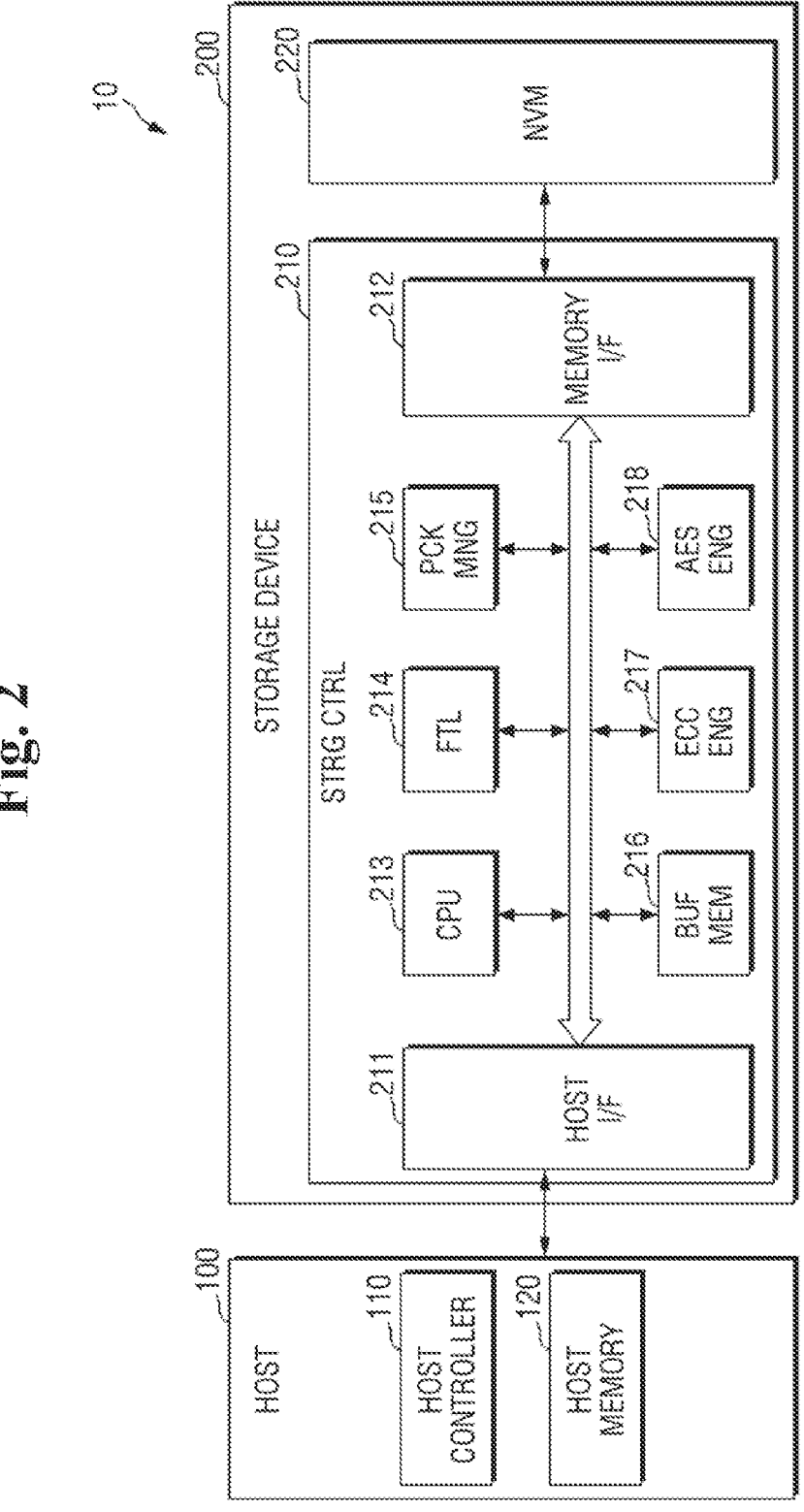
FIG. 2 is a block diagram of a host storage system according to some embodiments.

FIG. 2 is a block diagram of a host storage system 10 according to some embodiments.

The host storage system 10 may include a host 100 and a storage device 200. Further, the storage device 200 may include a storage controller 210 and an NVM 220. For example, the storage device 200 may be an example of one of the storage devices 1300a, 1300b in FIG. 1. According to some embodiments, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to some embodiments, the host controller 110 and the host memory 120 may be implemented as separate semiconductor chips. In some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface (I/F) 211, a memory interface (I/F) 212, and a CPU 213. The storage controllers 210 may further include a flash translation layer (FTL) 214, a packet manager (PCK MNG) 215, a buffer memory (BUF MEM) 216, an error correction code (ECC) engine (ENG) 217, and an advanced encryption standard (AES) engine (ENG) 218. The storage controller 210 may further include a working memory (not shown) in which the FTL 214 is loaded. The CPU 213 may execute the FTL 214 to control data write and read operations on the NVM 220.

The host interface (I/F) 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface (I/F) 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager (PCK MNG) 215 may generate a packet according to a protocol of an interface, which consents to the host 100, or parse various types of information from the packet received from the host 100. In some embodiments, the buffer memory (BUF MEM) 216 may temporarily store data to be written to the NVM 220 or data to be read from the NVM 220. In some embodiments, the buffer memory 216 may be a component included in the storage controllers 210. In some embodiments, the buffer memory 216 may be outside the storage controllers 210.

The ECC engine (ENG) 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine (ENG) 218 may perform at least one of an encryption operation and a decryption operation on data input to the storage controllers 210 by using a symmetric-key algorithm.

It should be understood that the above descriptions of the storage apparatuses are provided only as examples, and the storage apparatuses according to various embodiments of the present disclosure are not limited to the above examples. The data processing method according to exemplary embodiments of the present disclosure will be described below in conjunction with FIG. 3.

Figure 3:
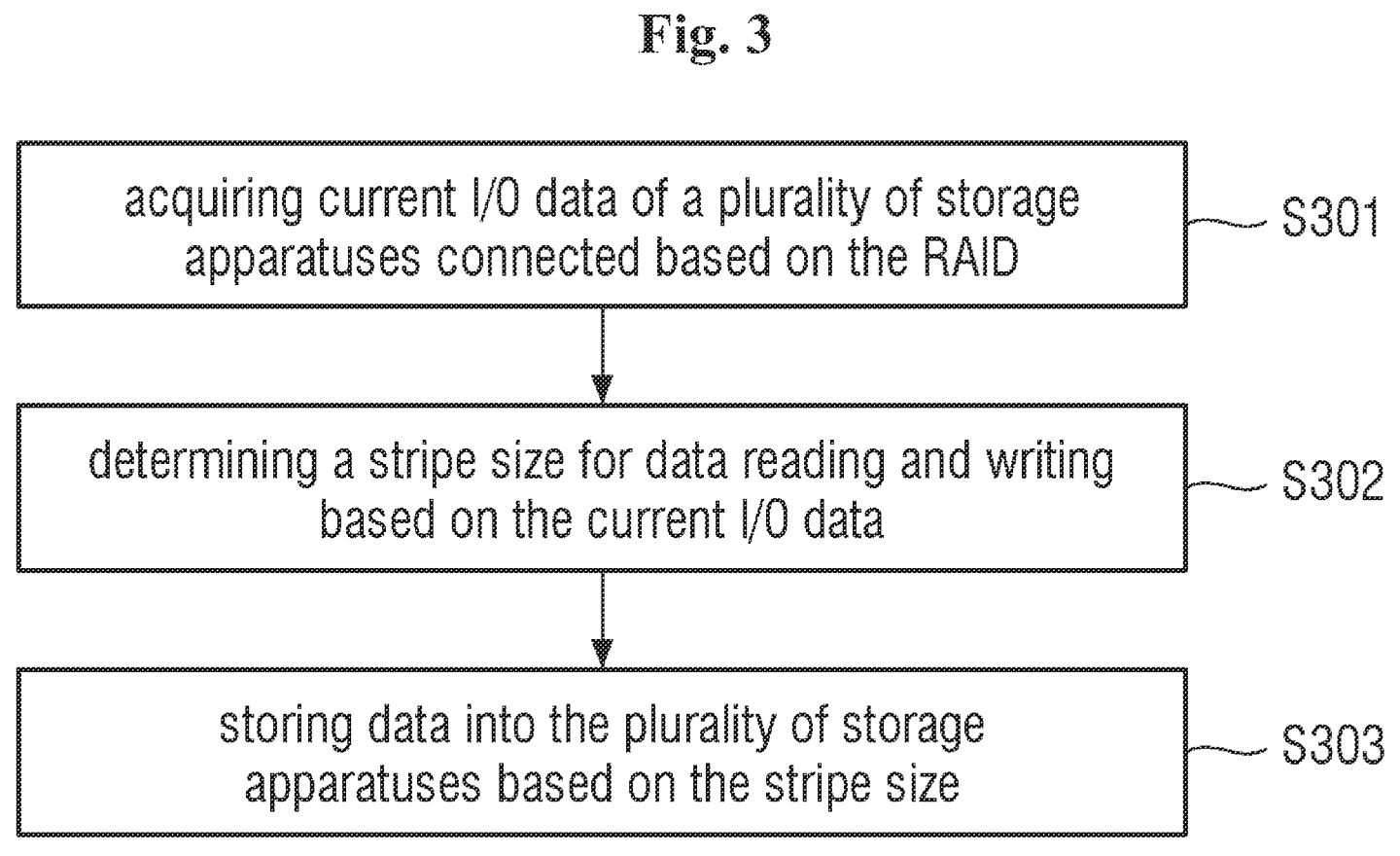

FIG. 3 is a flow chart illustrating a data processing method according to some embodiments. In some embodiments, the data processing method of FIG. 3 may be implemented by the main processor 1100 illustrated in FIG. 1 or a component thereof such as the CPU core 1110, the controller 1120, or the accelerator 1130.

Referring to FIG. 3, at step S301, current input/output (I/O) data of a plurality of storage apparatuses connected based on the RAID is acquired.

Specifically, the RAID according to some embodiments may include RAID 0. However, this is only an example, and in some embodiments, the RAID may be a different type of RAID. The RAID 0 may mean a technology for storing dispersedly data into a plurality of storage apparatuses (e.g., magnetic disks) according to a stripe size, and may fully utilize storage capacities of the storage apparatuses and may perform parallel operations with respect to the plurality of storage apparatuses.

By using the plurality of storage apparatuses connected based on the RAID to perform the data processing, a bandwidth of a bus may be fully utilized, thus significantly improving an overall reading and writing performance of data processing.

Specifically, the plurality of storage apparatuses connected based on the RAID may include a plurality of identical storage apparatuses, a plurality of storage apparatuses that are different from each other, or a combination of a plurality of identical storage apparatuses and a plurality of storage apparatuses that are different from each other. However, the storage devices are not limited thereto. In some embodiments, for example, the plurality of storage apparatuses connected based on the RAID may include a UFS and a SSD connected based on the RAID. Herein, a definition of the storage apparatus has been specifically described above and the details of the storage apparatus will not be repeated here.

Specifically, the I/O data may include data representing main features of I/O operations of a plurality of storage apparatuses. According to some embodiments, the I/O data may include at least one of a file type, an I/O size, whether the I/O is a random reading and writing, and whether the I/O operation on the I/O data is a buffered I/O operation.

The file type according to some embodiments may include a type of a file on which a data processing (e.g., data reading/writing) is performed using the I/O operation, such as, but not limited to, a resource file, a multi-media file, a SQLite file, a SQLite-temp file, and/or an executable file. For example, for I/O operations of reading on a certain mobile terminal, a number of the I/O operations with the file type of multimedia may account for approximately 80% of a total number of the I/O operations of reading, and for I/O operations of writing on the mobile terminal, a number of the I/O operations with the file types of SQLite and SQLite-temp may account for approximately 70% of a total number of the I/O operations of writing.

The I/O size according to some embodiments may also be referred to as an I/O data size, which may represent a size of data requested by a single I/O operation. For example, the I/O size may include, but is not limited to, 4 KB, 16 KB, 64 KB, 256 KB, etc. For example, for I/O operations of reading on a certain mobile terminal, a number of the I/O operations with an I/O size of 4 KB may account for approximately 40% of a total number of the I/O operations of reading, and for I/O operations of writing on the mobile terminal, a number of the I/O operations with a I/O size of 4 KB may account for approximately 50% of a total number of I/O operations of writing.

According to some embodiments, the I/O operation may be considered to be a sequential read and write if data reading and writing is performed on continuous storage spaces, or may be considered to be a random reading and writing if the read/written data is distributed across different storage spaces and the read/written data are not in a fixed order. According to some embodiments, the I/O data may include whether an I/O operation is a random reading and writing. For example, for I/O operations of reading on a certain mobile terminal, a number of I/O operations of random reading and writing may account for approximately 10% of a total number of I/O operations of reading, and for I/O operations of writing on the mobile terminal, a number of I/O operations of random reading and writing may account for approximately 20% of a total number of I/O operations of writing.

According to some embodiments, the buffered I/O operation may be referred to as an IO operation with buffering, and may represent an I/O operation that uses a buffer when reading and writing data to reduce a number of invocations. According to some embodiments, the I/O data may include whether an I/O operation is buffered. For example, for I/O operations of writing for a certain mobile terminal, a number of buffered I/O operations may be much larger compared to a number of synchronous I/O operations.

While the various data described above may be used to represent the main features of the I/O data, it should be understood that the I/O data according to various embodiments may also include any other data that may represent the main features of the I/O data.

At step S302, stripe size for data reading and writing is determined based on the current I/O data. Specifically, the stripe size for data reading from the plurality of storage apparatuses may be dynamically determined by using the acquired current I/O data, thereby avoiding degradation of data processing performance caused by performing data reading and writing using a single fixed stripe size.

According to some embodiments, the determining the stripe size for the data reading and writing based on the current I/O data may include determining the stripe size corresponding to the current I/O data based on a training model. Specifically, the current I/O data, which is a feature input to the model, is input to the training model, and a stripe size that is the most suitable for the current I/O data is output by the training model, to obtain maximum data processing performance.

The training model according to some embodiments may be obtained by acquiring historical I/O data of the plurality of storage apparatuses and obtaining a training model by performing model training according to the historical I/O data, using a reinforcement learning algorithm. According to some embodiments, the historical I/O data may include previously recorded I/O data and corresponding performance parameters, wherein the previously recorded I/O data may include, but is not limited to, the data described above that may be used to represent the main features of the I/O data, and the performance parameters may include, but are not limited to, a speed of data reading and writing, a data processing efficiency, the stripe size, and the like.

According to some embodiments, the reinforcement learning algorithm may include a Q-learning algorithm. Specifically, a Q-table may be obtained by performing the model training according to the historical I/O data, using the Q-learning algorithm, and the stripe size corresponding to the current I/O data may be obtained by querying the Q-table. The processing of the model training using the Q-learning algorithm will now be described in detail.

Firstly, the Q-table is initialized. Specifically, during an initialization stage of the processing of the model training using the Q-learning algorithm, the Q-table is created and initialized, wherein one direction of the Q-table (e.g., a row direction) may represent a state s, another direction (e.g., a column direction) may represent an action a, and a value in the Q-table may represent a Q-value Q(s, a), wherein Q(s, a) represents a long-term reward of selecting the action a in the state s. Herein, initial Q-values are all zero.

Then, the action is selected. Specifically, one action a in the state s is estimated based on a current Q-value. After the Q-table is initialized, the action may be selected using a predetermined strategy.

When the action is selected, the action is executed, the state s' as a result is observed and a reward R is measured.

By using the following Bellman equation (1), a new Q-value NewQ(s, a) is calculated based on a new state s' and a corresponding reward R(s, a):

$$NewQ(s, a) = Q(s, a) + \alpha[R(s, a) + \gamma \max Q'(s', a') - Q(s, a)] \qquad (1)$$

Wherein, Q(s, a) represents a long-term reward of performing the action a in the current state s; R(s, a) represents an immediate reward of performing the action a in the state s; $\gamma$ referents a discount factor; $\max Q'(s', a')$ represents a long-term reward of performing an action a' in a given new state s', that is, a maximum long-term reward in the given new state s'.

Throughout a life cycle or before training is suspended, the above processing of selecting the action, executing the action, and updating the Q-value is repeated continuously, until a predetermined number of times of training or other aborting training conditions are reached.

Thus, by updating the Q-table using the Q-learning algorithm, the optimal Q-table for determining the stripe size may be obtained based on the historical I/O data vectorized and mapped to a digital format. When the current I/O data is acquired, the current I/O data is vectorized and mapped to the digital format as an input, and the optimal stripe size corresponding to the current I/O data is obtained by querying the optimal Q-table. In other words, a trained converged Q-table may be obtained based on the collected historical I/O data through offline training, and then the obtained Q-table may be deployed to the driver layer, and in this case, for the current I/O data, the optimal stripe size may be queried in real time using the Q-table.

As an example, the offline-trained Q-table may be deployed to the driver layer, and when the current I/O data in real-time is acquired, the stripe size is queried based on the current I/O data at the driver layer, for data processing.

As such, the stripe size for data reading and writing is dynamically determined by using the reinforcement learning method, thereby adjusting operations of data processing suitable for the current I/O data in real time, and improving the data processing performance.

At step S303, data is stored into the plurality of storage apparatuses based on the stripe size. Specifically, when the stripe size for data reading and writing is determined, the RAID-based data processing operation may be performed (e.g., by the driver layer) based on the determined stripe size.

As such, by adjusting the stripe size in real time, the data processing method may ensure a stable and optimal performance of reading and writing operations for data processing, thereby improving a user experience.

Since the stripe size according to some embodiments is dynamically changing, the data processing method according to some embodiments may further include recording the stripe size and a logical address corresponding to the data stored based on the stripe size. Specifically, information such as the stripe size and the logical address corresponding to the data and/or the storage apparatus may be recorded in a mapping table. When an application requests an operation on the data (e.g., requests to read data, requests to write data), the logical address and the stripe size of the data may be determined based on the mapping table, to quickly acquire the data.

By recording the changing stripe size and the storage address corresponding to the data, data may be read and written quickly using the recorded address, thereby avoiding problems such as slow data retrieval due to an unfixed stripe size.

Figure 4:
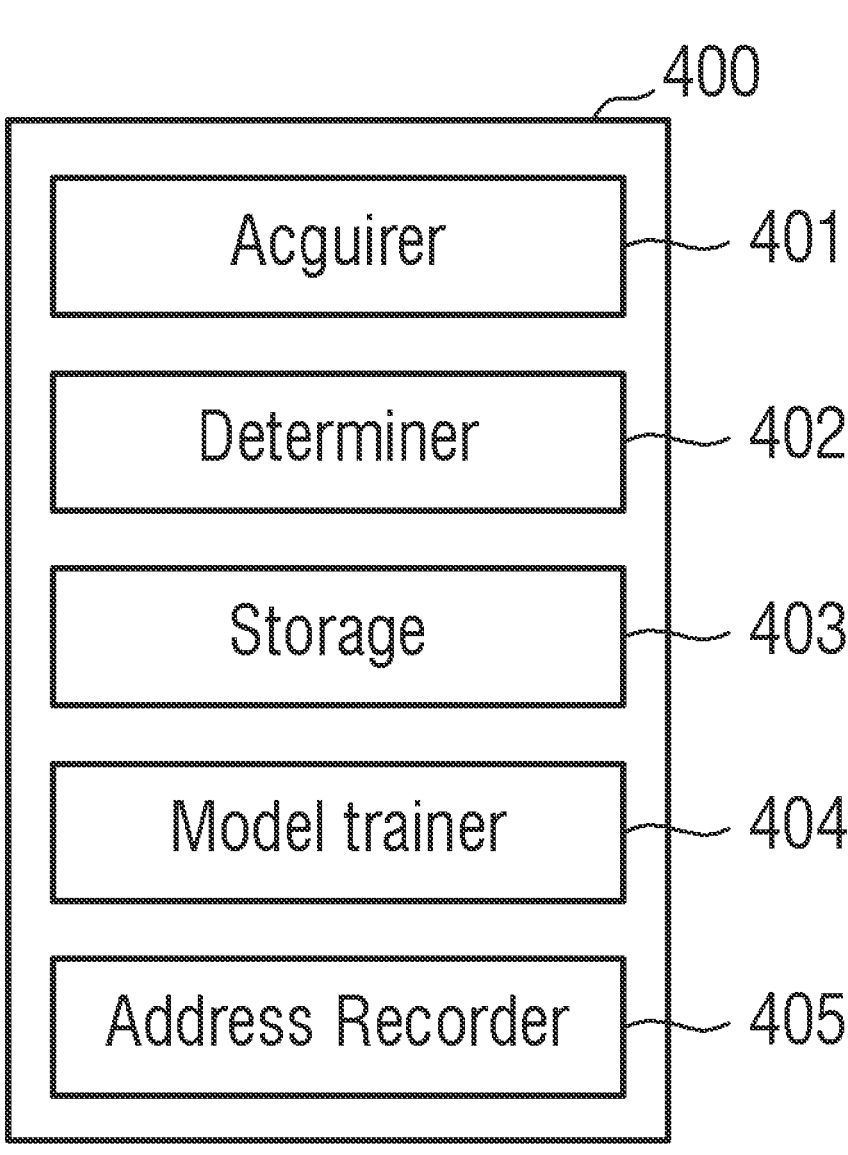
FIG. 4 is a block diagram illustrating a data processing device according to some embodiments.

FIG. 4 is a block diagram illustrating a data processing device according to some embodiments.

Referring to FIG. 4, the data processing device 400 according to some embodiments may include a data acquirer 401, a stripe determiner 402, and a data storer 403. In some embodiments, the data acquirer 401, the stripe determiner 402, and the data storer 403 may implemented by at least one processor operating in conjunction with at least one memory. For example, in some embodiments, the data acquirer 401, the stripe determiner 402, and the data storer 403 may implemented by the main processor 1100 (or a component thereof) illustrated in FIG. 1.

According to some embodiments, the data acquirer 401 is configured to acquire current Input/output (I/O) data of a plurality of storage apparatuses connected based on the RAID, the stripe determiner 402 is configured to determine a stripe size for data reading and writing based on the current I/O data, and the data storer 403 is configured to store data into the plurality of storage apparatuses based on the stripe size. That is, the data acquirer 401 may perform an operation corresponding to the step S301 of the data processing method as described above with reference to FIG. 3, the stripe determiner 402 may perform an operation corresponding to the step S302 of the data processing method as described above with reference to FIG. 3, and the data storer 403 may perform an operation corresponding to the step S303 of the data processing method as described above with reference to FIG. 3.

According to some embodiments, the I/O data includes at least one of a file type, an I/O size, whether the I/O data operation is a random reading and writing, and whether the I/O data operation is a buffered I/O operation.

According to some embodiments, the data processing device 400 may further include a model trainer 404. According to some embodiments, the model trainer 404 may be configured to acquire historical I/O data of the plurality of storage apparatuses; obtaining a training model by performing model training according to the historical I/O data, using a reinforcement learning algorithm. According to some embodiments, the stripe determiner 402 is configured to determine the stripe size for the data reading and writing based on the current I/O data by determining the stripe size corresponding to the current I/O data based on the training model.

According to some embodiments, the reinforcement learning algorithm may include a Q-learning algorithm. According to some embodiments, the model trainer is configured to obtain the training model by performing the model training according to the historical I/O data, using the reinforcement learning algorithm by: obtaining a Q-table by performing the model training according to the historical I/O data, by using a Q-learning algorithm. According to some embodiments, the stripe determiner 402 is configured to determine the stripe size corresponding to the current I/O data based on the training model by: obtaining the stripe size corresponding to the current I/O data by querying the Q-table.

According to some embodiments, the data processing device 400 may further include an address recorder 405. The address recorder 405 may be configured to record the stripe size and a logical address corresponding to the data stored based on the stripe size.

The specific manners in which each component of the data processing device 400 performs operations in the above embodiments have been described in detail in the related embodiments of the data processing method, and will not be explained in detail here.

Furthermore, it should be understood that each unit in the data processing device 400 according to various embodiments may be implemented as a hardware component and/or a software component. Those skilled in the art may implement the respective unit such as, by using Field Programmable Gate Array (FPGA) or Application Specific Integrated Circuits (ASIC), based on the defined processing performed by the each component.

According to some embodiments, an electronic apparatus may also be provided, which includes at least one processor; and at least one memory storing computer executable instructions, wherein the computer executable instructions, when being executed by the at least one processor, cause the at least one processor to perform the data processing method as described above.

According to some embodiments, the electronic apparatus may be a PC computer, a tablet device, a personal digital assistant, a smartphone, or other devices capable of executing the above set of instructions. Herein, the electronic apparatus does not have to be a single electronic apparatus, but in some embodiments may be an assembly of any device or circuit that is capable to execute the above instructions (or instruction sets) individually or jointly. The electronic apparatus may also be a part of an integrated control system or system manager, or may be configured as a portable electronic apparatus that is interfaced with a local or remote (e.g., via wireless transmission).

In the electronic apparatus, the processor may include a central processing unit (CPU), a graphics processing unit (GPU), a programmable logic device, a specialized processor system, a microcontroller, or a microprocessor. By way of example rather than a limitation, the processor may also include an analog processor, a digital processor, a microprocessor, a multicore processor, a processor array, a network processor, and the like.

The processor may execute the instructions or codes stored in the memory, wherein the memory may also store data. The instructions and data may also be transmitted and received through a network via a network interface device, wherein the network interface device may adopt any known transmission protocol.

The memory may be integrated with the processor, for example, by placing a RAM or flash memory within an integrated circuit microprocessor, etc. In some embodiments, the memory may include an independent device, such as, an external disk driver, a storage array, or other storage devices that may be used by any database system. The memory and processor may be coupled operationally, or they may communicate with each other, such as through an I/O port, a network connection, etc., so that the processor is capable of reading a file stored in the memory.

In some embodiments, the electronic apparatus may also include a video display (such as, a LCD display) and a user interaction interface (such as, a keyboard, mouse, touch input device, etc.). All components of the electronic apparatus may be connected to each other through a bus and/or network.

According to some embodiments, a computer-readable storage medium may be also provided, wherein instructions in the computer-readable storage medium, when being executed by at least one processor, cause the at least one processor to perform the data processing method as described above.

According to some embodiments, an example of the computer-readable storage medium here includes: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state hard disk (SSD), card memory (such as a multimedia card, secure digital (SD) card, or extreme digital (XD) card), magnetic tape, floppy disk, magneto-optical data storage device, optical data storage device, hard disk, solid state disk, and any other devices configured to store the computer programs and any associated data, data files and data structures in a non-transitory manner, and provide the computer programs and any associated data, data files and data structures to a processor or computer so that the processor or computer can execute the computer programs. The computer programs in the above-mentioned computer readable-storage medium can be executed in an environment deployed in an electronic apparatus such as a client, a host, a proxy device, a server, etc. In some embodiments, in one example, the computer programs and any associated data, data files and data structures are distributed over networked computer systems so that the computer programs and any associated data, data files and data structures are stored, accessed and executed in a distributed manner by one or more processors or computers.

After considering the specifications and practicing the various embodiments disclosed herein, those skilled in the art will easily come up with other embodiments consistent with the present disclosure. The purpose of the present application is to cover any variations, uses, or adaptations of the present disclosure, which follow the general principles of the present disclosure and include common knowledge or commonly-used technical means in the technical field that are not disclosed in the present disclosure. The specification and embodiments are only considered exemplary, and the true scope and spirit of the present disclosure are indicated by the claims.

It should be understood that the present disclosure is not limited to the precise structure already described above and shown in the accompanying drawings, and various modifications and changes may be made without departing from scope thereof. The scope of the present disclosure is limited only by the claims.

What is claimed is:

1. A data storing method comprising:
acquiring current Input/Output (I/O) data of a plurality of storage apparatuses connected based on Redundant Arrays of Independent Disks (RAID);
setting a stripe size for a data operation based on the current I/O data, wherein the stripe size defines a data block size for storing dispersedly the current I/O data into the plurality of storage apparatuses; and
storing the current I/O data into the plurality of storage apparatuses based on the set stripe size.

2. The data storing method according to claim 1, wherein the data operation is a read operation or a write operation.

3. The data storing method according to claim 1, wherein the RAID is RAID 0.

4. The data storing method according to claim 1, wherein the I/O data comprises at least one of a file type, an I/O size, whether an I/O operation is a random reading and writing operation, and whether the I/O operation is a buffered I/O operation.

5. The data storing method according to claim 1, further comprising:
acquiring historical I/O data of the plurality of storage apparatuses; and
training a model based on the historical I/O data, using a reinforcement learning algorithm,
wherein the stripe size is set based on the trained model.

6. The data storing method according to claim 5, wherein the reinforcement learning algorithm comprises a Q-learning algorithm,
wherein training the model comprises:
obtaining a Q-table by training the model according to the historical I/O data, using the Q-learning algorithm,
wherein setting the stripe size comprises:
obtaining the stripe size by querying the Q-table.

7. The data storing method according to claim 1, further comprising:
recording the set stripe size, and a logical address corresponding to the I/O data that is stored based on the set stripe size.

8. An electronic apparatus comprising:

at least one processor; and at least one memory that stores computer executable instructions, wherein the computer executable instructions, when accessed and executed by the at least one processor, cause the at least one processor to perform the data storing method according to claim 1.

9. The electronic apparatus according to claim 8, wherein the data operation is a read operation or a write operation.

10. The electronic apparatus according to claim 8, wherein the RAID is RAID 0.

11. The data storing method according to claim 1, wherein the I/O data comprises at least one of a file type, whether an I/O operation is a random reading and writing operation, and whether the I/O operation is a buffered I/O operation.

12. A data storing device comprising at least one processor configured to function as at least:

a data acquirer configured to acquire current Input/Output (I/O) data of a plurality of storage apparatuses connected based on Redundant Arrays of Independent Disks (RAID);

a stripe determiner configured to set a stripe size based on the I/O data, wherein the stripe size defines a data block size for storing dispersedly the I/O data into the plurality of storage apparatuses; and a data storer configured to store the current I/O data into the plurality of storage apparatuses based on the set stripe size.

13. The data storing device according to claim 12, wherein the data operation is a read operation or a write operation.

14. The data storing device according to claim 12, wherein the RAID is RAID 0.

15. The data storing device according to claim 12, wherein the I/O data comprises at least one of a file type, an I/O size, whether an I/O operation is a random reading and writing operation, and whether the I/O operation is a buffered I/O operation.

16. The data storing device according to claim 12, further comprising a model trainer configured to:

acquire historical I/O data of the plurality of storage apparatuses; and train a model based on the historical I/O data, using a reinforcement learning algorithm, wherein the stripe determiner is configured to set the stripe size based on the trained model.

17. The data storing device according to claim 16, wherein the reinforcement learning algorithm comprises a Q-learning algorithm, wherein the model trainer is configured to train the model by:

obtaining a Q-table by training the model according to the historical I/O data, using the Q-learning algorithm, wherein the stripe determiner is configured to set the stripe size by querying the Q-table.

18. The data storing device according to claim 12, further comprising an address recorder configured to:

record the stripe size, and a logical address corresponding to the I/O data that is stored based on the stripe size.

* * * * *